United States Patent [19]

Bradley et al.

[11] Patent Number: 5,445,512

[45] Date of Patent: Aug. 29, 1995

[54] SEGMENTED PISTON FACE PLATE ASSEMBLY FOR PATTY FORMING APPARATUS

[75] Inventors: Gary W. Bradley, Overland Park; Ronald D. Chapman, Lake Quivira, both of Kans.

[73] Assignee: Marlen Research Corporation, Overland Park, Kans.

[21] Appl. No.: 186,849

[22] Filed: Jan. 27, 1994

[51] Int. Cl.6 .................... A22C 7/00; B29C 33/46
[52] U.S. Cl. ..................... 425/193; 425/437
[58] Field of Search ............. 425/437, 139, 436 RM, 425/193

[56] References Cited

U.S. PATENT DOCUMENTS

| 2,951,260 | 9/1960 | Harrison et al. | 425/437 |
| 3,305,434 | 2/1967 | Bernier et al. | 425/437 |
| 3,825,378 | 7/1974 | Dart et al. | 425/437 |
| 4,212,609 | 7/1980 | Fay | 425/100 |
| 4,371,329 | 2/1983 | Steels | 425/437 |
| 4,706,924 | 11/1987 | de Larosiere | 425/437 |
| 4,987,643 | 1/1991 | Powers et al. | 425/139 |

FOREIGN PATENT DOCUMENTS

| 44-13594 | 6/1969 | Japan | 425/437 |
| 368616 | 5/1963 | Switzerland | 425/437 |
| 1084119 | 9/1967 | United Kingdom | 425/437 |
| 2230490 | 10/1990 | United Kingdom | 425/437 |

*Primary Examiner*—James P. Mackey
*Attorney, Agent, or Firm*—Hovey, Williams, Timmons & Collins

[57] ABSTRACT

An improved patty forming apparatus (20) is provided with a removable piston face plate assembly (150) adapted to be removably coupled to each piston associated with a cavity head (78) and adapted to move between a retracted meat-filling position wherein respective patty forming cavities (90) are filled with patty material to an extended patty-discharging position wherein formed meat patties are ejected; the piston face plate assembly (150) includes three concentrically nested planar plate members (154, 158, 162) having mating sidewalls (170, 178, 230, 250) with air passageways (270–279) formed between the sidewalls for delivery of air from an aperture through the piston center to the patty material-engaging face of the face plate assembly; interference zones (284) formed between the air passageways (270–279) are provided for releasably securing the assembly members (154, 158, 162) together for permitting disassembly for quick cleaning.

7 Claims, 3 Drawing Sheets

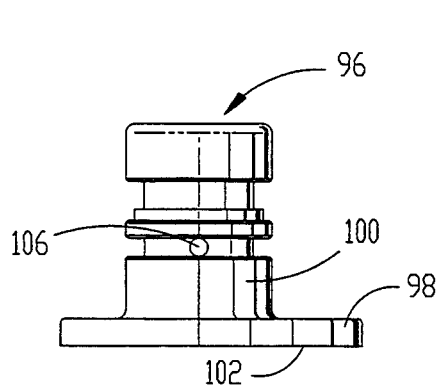
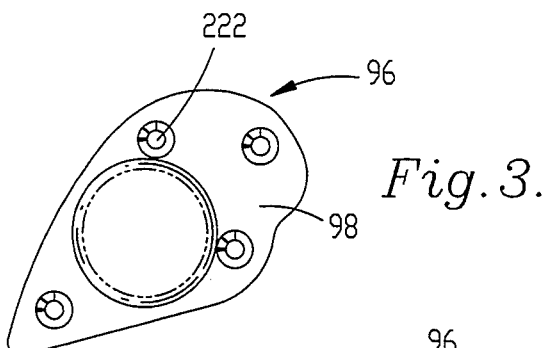
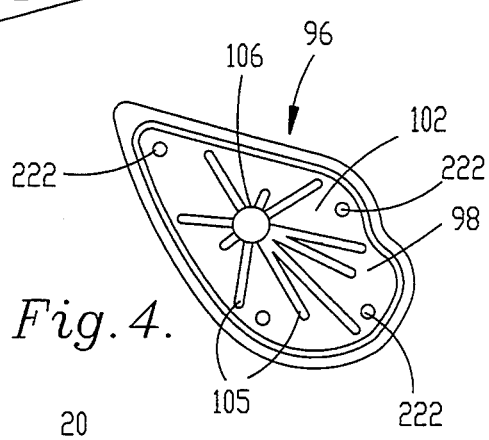
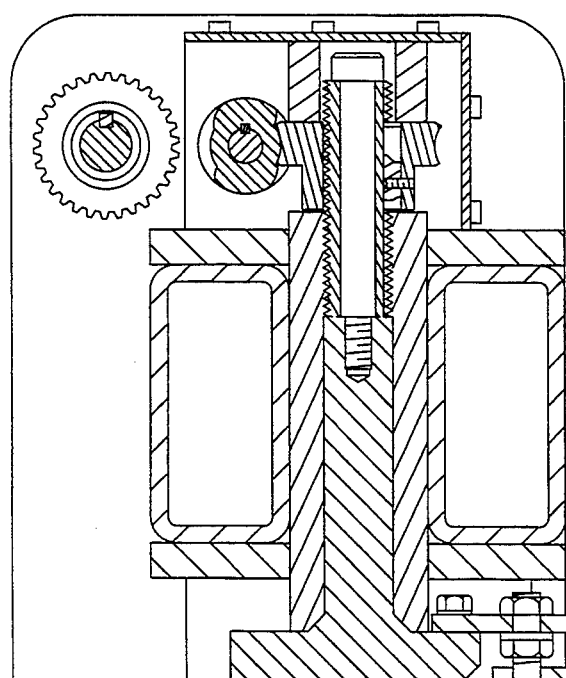
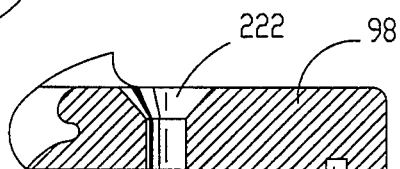
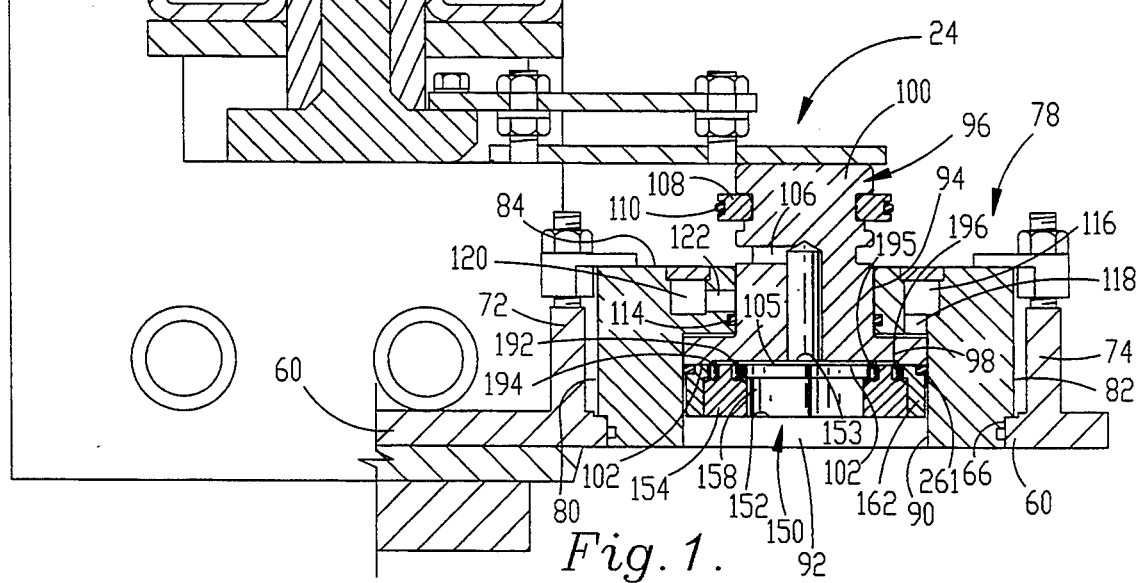

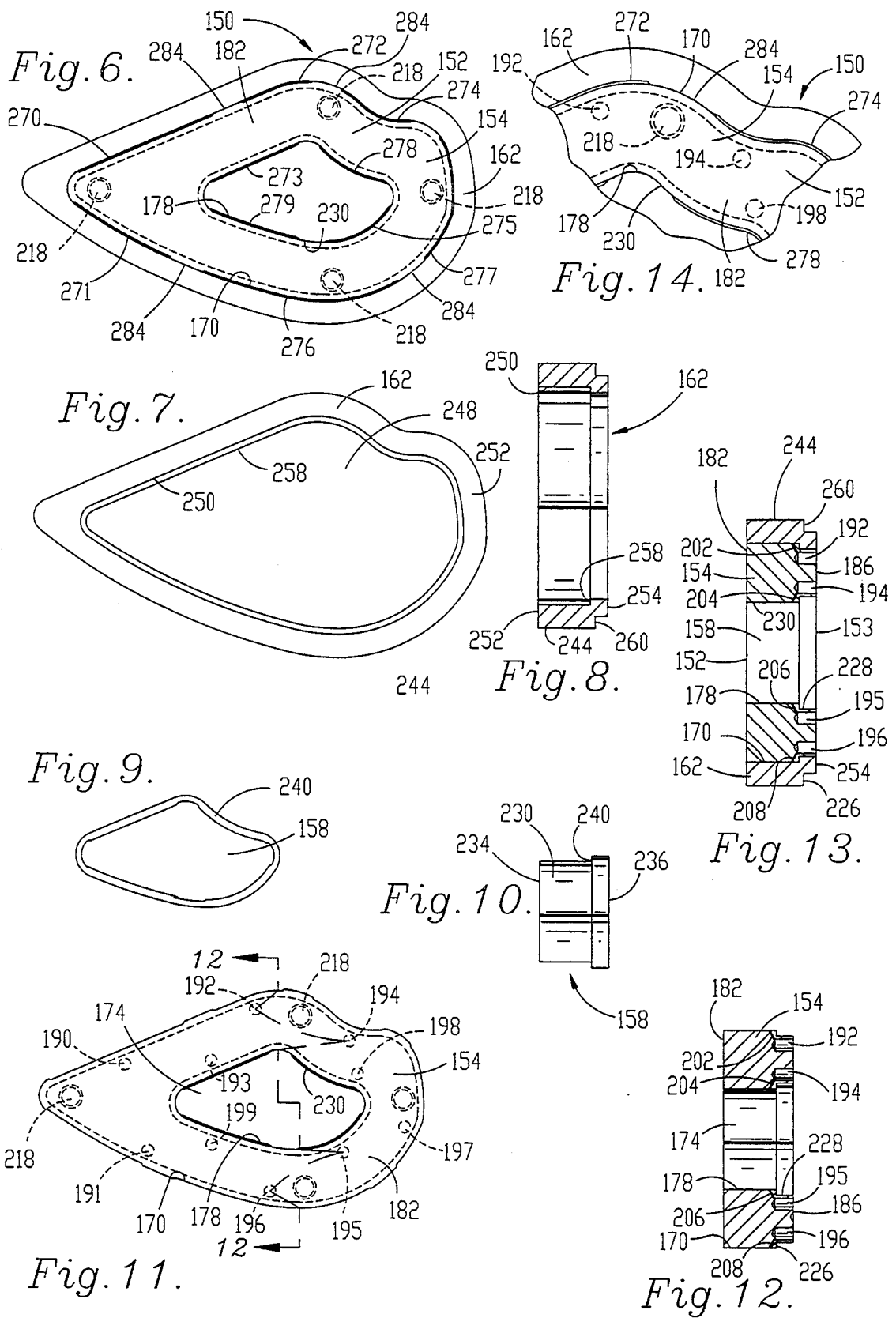

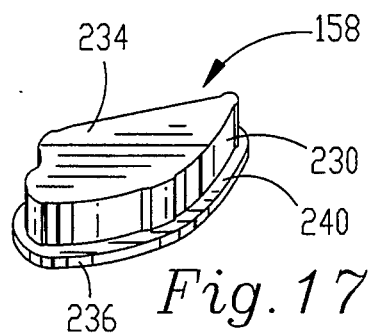
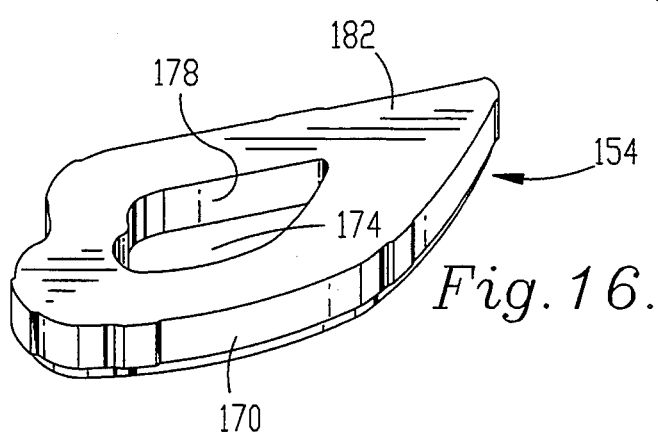
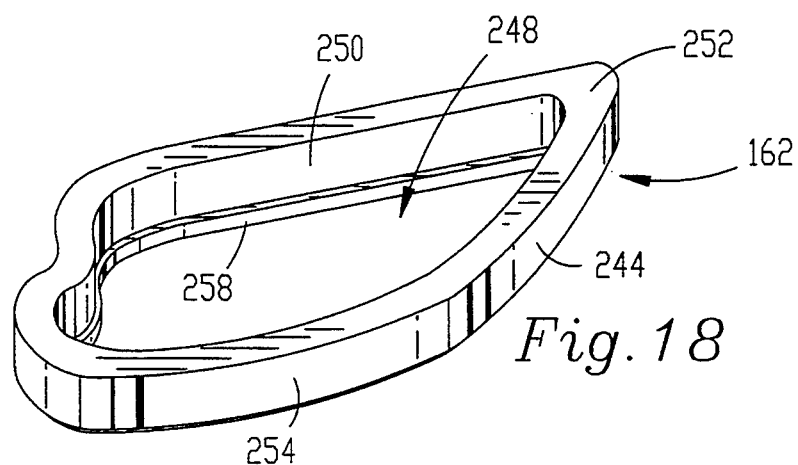
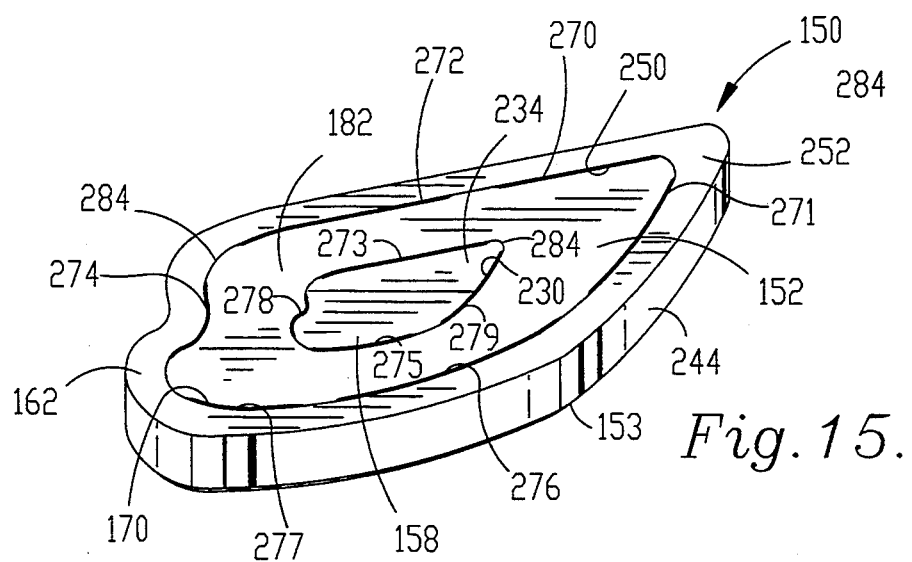

SEGMENTED PISTON FACE PLATE ASSEMBLY FOR PATTY FORMING APPARATUS

BACKGROUND OF THE INVENTION

1. Field of the Invention

The present invention is broadly concerned with a high-capacity patty forming apparatus adapted for use in the commercial production of meat patties formed of, for example, chicken, beef, or pork. More particularly, it is concerned with equipment of this type which preferably is equipped with a cavity head adapted to receive and form patties, and a piston having a segmented, non-porous patty-engaging face together with structure for delivering bursts of pressurized air through the piston face in order to positively disengage the formed patties from the cavity. The preferred apparatus includes a three-member, segmented piston face plate assembly provided with air passageways formed between the members and adapted to be easily disassembled for cleaning.

2. Description of the Prior Art

Large food processors supplying meat patties to restaurants and fast food chains make use of industrial sized patty forming equipment. Such equipment is essential in order to economically produce the huge quantities of meat patties needed to meet consumer demand. In general, this equipment includes at least one piston and cavity head adapted to move between a retracted meat-filling position, wherein a patty forming cavity is filled with meat, to an extended patty-discharging position.

U.S. Pat. No. 4,987,643 (incorporated by reference herein) describes a patty forming apparatus especially designed for high-capacity patty formation. To this end, the apparatus described in the '643 patent is provided with a novel reciprocating slide plate equipped with a removable, multiple piston and cavity head adapted to receive and form patties, and with a piston-adjusting mechanism permitting both individual and ganged adjustment of patty thickness without the necessity of piston removal. The pistons disclosed in the '643 patent are provided with a porous, sintered metal or ceramic face plate coupled to and defining the lowermost material-engaging face of the overall piston.

In experimental practice with the apparatus described in the '643 patent, it has been determined that the porous face plate is difficult to machine and, in use, becomes easily plugged and may be difficult to clean. The porous face plate is typically formed of sintered material having an average pore diameter of from 2 to about 15 microns (most preferably about 5 microns). The process of sintering generally involves the compression of metal powders at room temperature and the subsequent baking of the resulting compact at elevated temperatures without the application of pressure.

Because virtually any shaped piston can be used, including circular, square, oval or contoured free form, a sintered compact must be fabricated to conform to the piston shape. This forming process often requires that the sintered compact undergo difficult machining and welding processes. Machining is difficult because the compact is generally brittle and can become deformed easily during face plate fabrication. Welding is difficult because the welding and forming characteristics of a sintered metal are different than those of a welding rod of identical metal often used during face plate fabrication.

In operation, the sintered face plate can become plugged or fouled with patty material because of the small average pore diameter. Once plugged, the sintered face plate is troublesome to effectively clean and unplug. A sintered face plate which cannot be effectively cleaned must be discarded, requiring that a new face plate be installed, resulting in higher equipment and operational costs.

There is accordingly a need in the art for an improved piston apparatus having means by which pressurized air may be directed through the piston and piston face for forcibly separating a formed patty from the piston face, which is easier and less costly to manufacture; and which, in operation, undergoes less plugging and is easier to clean.

OBJECTS AND SUMMARY OF THE INVENTION

It is an object of the present invention to overcome the problems outlined above, and provide an improved segmented, non-porous piston face plate assembly equipped with means for communication of bursts of pressurized fluid through the piston and face plate assembly to forcibly separate a patty from the patty material-engaging face of the face plate assembly.

Broadly speaking, the apparatus of the present invention is of a type which includes at least one piston and cavity head adapted to move between a retracted filling position wherein respective patty forming cavities are filled with material to an extended patty-discharging position wherein formed mat patties are ejected. The apparatus further includes means for forcibly separating the patty from the piston by the application of a burst of pressurized fluid through the piston's associated face to separate the meat therefrom.

In the context of equipment used to form meat patties, a particularly preferred patty forming apparatus is of the type described previously in U.S. Pat. No. 4,987,643. The apparatus disclosed in the '643 patent includes a slide plate-type patty forming apparatus with a reciprocating slide plate having a removable, multiple piston and cavity head adapted to move between a retracted meat-filling position to an extended patty-discharging position. In such equipment, adjusting mechanisms are provided for altering the thickness of formed patties by use of a plurality of adjusting units equipped with a vertically shiftable, piston-engaging foot.

A segmented piston face plate assembly is provided for releasably coupling to each piston at its lowermost portion and includes structure which communicates air passageways disposed in the lower piston face with a patty material-engaging face of the assembly. In the preferred embodiment, the assembly includes three concentrically nested members, each member including mating sidewalls. Each mating sidewall is adapted to be in registry with a sidewall of an adjacent member with air passageways formed therebetween. The members are further adapted to be releasably coupled for permitting rapid disassembly to permit quick cleaning.

BRIEF DESCRIPTION OF THE DRAWINGS

A preferred embodiment of the present invention is described in detail with reference to the attached drawing figures, wherein:

FIG. 1 is a vertical sectional view illustrating the details of a patty forming head and thickness adjustment mechanism disclosed in detail in U.S. Pat. No. 4,987,643;

FIG. 2 is an enlarged elevational view of a patty forming piston used in the overall apparatus;

FIG. 3 is a top view of the piston depicted in FIG. 2;

FIG. 4 is a bottom view of the piston depicted in FIG. 3, showing the radially extending air passageways in the piston lowermost portion;

FIG. 5 is a fragmentary sectional side view of the piston shown in FIG. 2, illustrating a screw coupling aperture and air passageway;

FIG. 6 is an enlarged bottom view of the piston face plate assembly;

FIG. 7 is an enlarged bottom view of the outer ring portion of the piston face plate assembly, depicting the continuous shoulder projection;

FIG. 8 is a side sectional view of the outer ring member of the assembly shown in FIG. 7;

FIG. 9 is a bottom view of the center portion member of the assembly showing the continuous shoulder projection;

FIG. 10 is a side view of the center portion member shown in FIG. 9;

FIG. 11 is an enlarged bottom view of the piston connector plate member showing fluid and coupling apertures;

FIG. 12 is a side sectional view of the connector ring member shown in FIG. 11, taken along the line 12—12, depicting the fluid apertures and ports in communication with the member mating sidewalls;

FIG. 13 is a side sectional view of the assembled base plate assembly shown in FIG. 6, depicting the fluid apertures and ports communicating the piston-engaging faces of the members to the mating sidewalls;

FIG. 14 is an enlarged fragmentary view of the assembly shown in FIG. 6, depicting air passageways and interference zones located between mating sidewalls;

FIG. 15 is a perspective bottom view of the assembly shown in FIG. 6;

FIG. 16 is a perspective bottom view of the connector ring member shown in FIG. 11;

FIG. 17 is a perspective bottom view of the center portion member shown in FIG. 9; and FIG. 18 is a perspective bottom view of the outer ring member shown in FIG. 7.

DETAILED DESCRIPTION OF THE PREFERRED EMBODIMENTS

Turning now to the drawings, and particularly FIG. 1, a patty forming apparatus 20 is illustrated. The overall apparatus is of the type described in U.S. Pat. No. 4,987,643 (incorporated by reference), which can be consulted for all necessary details. The apparatus 20 broadly includes a slide plate assembly 24 including an elongated, generally flat, planar slide plate 60 presenting a rearward edge (not shown), forward edge 64, and a large, substantially rectangular aperture 66 therethrough which is proximal to the forward edge 64. The plate 60 has a pair of upstanding, transverse stiffening ribs (not shown), as well as a pair of upright head connection plates 72, 74 adjacent to and in straddling relationship to aperture 66.

The assembly 24 further includes a head assembly broadly referred to by the numeral 78. The head assembly has a rectangular, box-like frame presenting a pair of upright sidewalls 80, 82, and a top sidewall 84 and opposed end sidewall (not shown). The head assembly 78 of the preferred patty forming apparatus 20 is configured to present a plurality of patty forming cavities 90 along the length of the head assembly end sidewalls, all relevant details of which are fully described in U.S. Pat. No. 4,987,643. Each cavity includes an enlarged lower region 92, together with a radially constricted upper portion 94. A shiftable piston 96 is slidably positioned within each cavity 90, and includes a lowermost enlarged section 98 situated within region 92 of the associated cavity, as well as an upstanding section 100 which extends through and above the radially constricted region 94 of the cavity. Each piston 96 is further provided with a piston lower face 102 configured to present a plurality of radially extending air passageways 105, as shown in FIG. 4.

The body of each piston 96 is provided with a pneumatic passageway 106 of inverted, somewhat L-shaped configuration which communicates with the lower piston face 102, and particularly the passageways 105 provided therein (see FIGS. 1 and 2). Section 100 of piston 96 has a two-piece, segmented stop ring 108 secured thereto, which is affixed by means of a circumscribing O-ring 110. Additional sealing of the piston within the associated cavity is provided by means of O-ring 114 located within an appropriate groove in section 98 and the top sidewall of the head assembly 24.

In order to effect downward discharge movement of piston 96, the head assembly includes a transfer sleeve extending air passageway or manifold 116 which extends the full length of the head assembly 78. A short vertical air passageway 118 is also provided for each piston which communicates passageway 116 with the face of the enlarged piston section 98, remote from the piston lower face plate 102. Additionally, a second transversely extending passageway or manifold 120 is also provided with short, radially inwardly extending air passageway 122 for each piston which communicates the passageway 120 and passageway 106 when the piston is in its lowered, patty-discharging position. A pneumatic fitting is provided for delivery of pressurized air to the passageway 120 and another such fitting (both not shown) communicates with passageway 116 for delivery of pressurized air thereto.

The head assembly 78 is affixed to slide plate 60 and is in registry with plate aperture 66. To this end, a series of threaded connectors 126 are secured to plates 72, 74 and include projecting tabs which engage the top sidewall 84 of the head section. The lower margin of each sidewall 80, 82 is notched as at 128 so as to receive and rest atop the adjacent portions of plate 60, a continuous seal 130 between the plate 160 and defining sidewalls of the head assembly completes the connection.

Although the pistons depicted in the drawings are intended to resemble a chicken breast in configuration, those skilled in the art will appreciate that virtually any shaped piston can be provided such as hexagonal, circular, square, oval or free form.

It will be further understood that the complete preferred patty forming apparatus includes structure for supporting the plate assembly 24 for shifting movement thereof between a position for receiving meat or other patty forming material into each cavity 90, and a spaced discharge position wherein formed patties are discharged. Structure is also included to supply the plate assembly 24 with patty forming material, including an appropriately sized chamber situated beneath the plate assembly adapted for coupling with a source of patty forming material under pressure. A conventional belt conveyor or other expedient is provided and is situated below the slide plate assembly 24 so as to catch the ejected patties and convey them for further processing.

Other details of the complete patty forming apparatus 20 are described in U.S. Pat. No. 4,987,643.

As shown in FIGS. 1 and 15, the piston 96 is further provided with a segmented piston face plate assembly 150 of the instant invention. The face plate assembly 150 is releasably coupled to piston lower face 102 and presents a patty-engaging face 152 and a piston-engaging face 153. Preferably, the face plate assembly 150 is fabricated from any durable metal or synthetic material and is a three-segment, interfitting assembly including a planar piston connector plate 154, a planar center portion 158 and a planar outer ring 162. The piston connector plate 154 presents a continuous exterior mating sidewall 170, the connector plate 154 having a large aperture 174 therethrough presenting a continuous interior mating sidewall 178 (see FIG. 16). The sidewalls 170 and 178 are generally parallel and define a patty material-engaging face 182 and piston-engaging face 186 opposite thereto. Referring to FIG. 11, the connector plate 154 is provided with a plurality of fluid apertures 190-199, located on the piston-engaging face 186 and extending partially through the connector plate 154 (as shown in FIG. 13). Threaded coupling apertures 218 are also provided on the piston-engaging face 186 for screw-type coupling to associated piston coupling apertures 222 extending through the enlarged piston section 98, as shown in FIG. 5. The upper margin of each sidewall 170 and 178 proximal to the piston-engaging face 186 is notched at 226 and 228, respectively, as shown in FIG. 12.

The center portion 158 presents a continuous exterior mating sidewall 230 which is substantially parallel to the connector plate exterior mating sidewall 170 and defines a patty material-engaging face 234 and a piston-engaging face 236 opposite thereto (see FIG. 17). The center portion 158 is adapted to be releasably affixed to and in registry with large aperture 174 of the piston connector plate 170, as shown in FIGS. 13 and 15. The upper margin of the exterior mating sidewall 230 proximal to piston-engaging face 236 is provided with a projecting shoulder 240 so as to be received and rest atop the adjacent interior sidewall notch 228 of the connector plate 154.

Planar outer ring 162 presents a continuous exterior sidewall 244 and a large aperture 248 therethrough presenting a continuous ring interior mating sidewall 250 (see FIG. 18). The sidewalls 244 and 250 are generally parallel to connector plate exterior wall 170 and define a patty material-engaging face 252 and piston-engaging face 254 opposite thereto. The upper portion of the ring interior mating sidewall 250 includes an extended shoulder 258 so as to be received and rest atop the adjacent exterior sidewall notch 226 of the connector plate 154. The upper margin of exterior sidewall 244 proximal to piston-engaging face 254 is notched at 260, as shown in FIG. 13. Sealing of the assembly within cavity 90 is provided by means of O-ring 261, as shown in FIG. 1. The piston connector plate 154 is adapted to be releasably affixed to and in registry with outer ring aperture 248.

As shown in FIG. 15, when so assembled, the patty-engaging faces 234, 182, and 252 of center portion 158, piston connector plate 154 and planar outer ring 162, respectively, cooperatively define the material-engaging face 152 of assembly 150.

A plurality of fluid ejection ports in the form of air passageways 270-279 are preferably formed between sidewalls 230 and 178, and sidewalls 170 and 250, as shown in FIG. 15. In the preferred embodiment, the air passageways 270-279 are about 0.002 inches wide and are separated by a plurality of interference zones 284 defined by portions of adjacent sidewalls 230, 178 and 170,250 which are in butting relationship having a length of at least 0.10 inch, as shown in FIG. 14. The interference zones 284 maintain the releasably coupled relationship between the connector plate 154 and the center portion 158 and outer ring 162. Fluid ports 202-208 associated with each fluid aperture 190-199 communicate fluid apertures 190-199 with air passageways 270-279 (see FIG. 13).

It will be apparent to one skilled in the art that interference zones 284 are created in the assembly 150 by appropriate fabrication of mating sidewalls 170, 178, 230 and 250 with proper mating tolerances so that interference zones 284 are sufficiently tight to prevent unintentional disassembly during operation, but are sufficiently loose to allow relatively easy disassembly by any appropriate means for cleaning when desired. When assembly 150 is disassembled, access to sidewalls forming air passageways 270-279 is permitted for cleaning. It will also be apparent to one skilled in the art that air passageways 270-279 are also formed by appropriate machining of sidewalls 170, 178, 230 and 250 during fabrication to create the desired air passageway width.

Air passageways 270-279 communicate fluid apertures 190-199 and associated fluid ports 202-208 with the patty-engaging face 152 of the piston 96. It is to be understood that the assembly 150 may, in the alternative, be provided with a continuous air passageway between the sidewalls of each segmented assembly member. In such an embodiment, each segmented member is releasably coupled directly to the piston lower face 102.

In the preferred embodiment, the assembly 150 is releasably coupled to the piston 96, as shown in FIG. 1, by means of threaded screws (not shown) inserted in piston coupling apertures 222 and coupling apertures 218 of connector plate 154, so that the assembly piston-engaging face 153 abuts piston lower face 102, as shown in FIG. 1.

It is also to be understood that while the preferred assembly 150 includes three segmented members, the assembly 150 may, in the alternative, comprise any number of segmented members, including as few as two such members to achieve desired patty ejection characteristics.

Attention is next directed to the operation of apparatus 20, which is described in detail in U.S. Pat. No. 4,987,643. Reciprocating slide plate 60 is adapted to move between a retracted meat-filling position wherein respective patty forming cavities 90 are filled with meat to an extended patty-discharging position wherein formed meat patties are ejected. The patty forming pistons 96 equipped with face plate assemblies 150 deliver air through air passageways 270-279 of face plate assembly 150 for cleanly ejecting formed patties therefrom. If sidewall air passageways 270-279 become plugged, or whenever desired, the face plate assembly 150 may be easily removed from the piston 96 for disassembly and cleaning. Disassembly is effected simply by removing screws from coupling apertures 218 and 222 and pressing center portion 158 out of connector plate aperture 174 and connector plate 154 out of outer ring aperture 248 by any appropriate means. Once so disassembled, it will be appreciated that the three members of the plate assembly 150 may be easily cleaned and reassembled.

Although the preferred patty forming apparatus 20 is of the type disclosed in U.S. Pat. No. 4,987,643, those skilled in the art will appreciate that the piston face plate assembly 150 of the present invention may be easily adapted for use with any one of a number of methods and machines for producing configured food products in die cavities which use air pressure or other fluids to eject the formed products from die cavities.

Although the invention has been described with reference to the preferred embodiment illustrated in the attached drawing figures, it is noted that substitutions may be made and equivalents employed herein without departing from the scope of the invention as recited in the claims.

We claim:

1. A patty forming piston apparatus, comprising:
   a reciprocable piston presenting a lower piston face;
   a segmented piston face plate assembly having a piston-engaging face and a patty-engaging face opposite thereto;
   means for releasably attaching said face plate assembly to said piston with said piston-engaging face in abutting, face-to-face relationship with said piston lower face,
   said face plate assembly including
      outer member having a circumscribing sidewall presenting respective opposed inner and outer sidewall surfaces, and
      at least one inner member nested within said outer member and presenting an outboard sidewall surface in substantial mating relationship with said inner sidewall surface of said outer member to define a sidewall interface between the outer and inner members,
      said inner sidewall surface and outboard sidewall surface being cooperatively configured to present structure at said sidewall interface defining a plurality of elongated, spaced apart air passageways between the outer and inner members, and elongated zones of interfit contact between said inner sidewall surface and said outboard sidewall surface for maintaining the nested configuration of the outer and inner members during reciprocation of said piston and use of the patty-forming apparatus while permitting ready
   denesting of the outer and inner members when the face late assembly is detached from said piston; and
   means carried by said piston for directing bursts of pressurized air through said passageways for separating a formed patty from said face plate assembly.

2. The patty forming piston apparatus as set forth in claim 1, said outer member further presenting opposed upper and lower surfaces extending between said inner and outer sidewall surfaces, at least one said inner member being disposed entirely within the confines of said upper and lower surfaces.

3. The patty-forming apparatus as set forth in claim 1, there being a pair of said inner members.

4. The patty-forming apparatus as set forth in claim 1, said inner and outer members being substantially concentric.

5. The patty-forming apparatus as set forth in claim 1, said air passageways being separated by said zones of interfit contact.

6. The patty-forming apparatus as set forth in claim 1, said inner sidewall surface and said outboard sidewall surface presenting cooperating shoulder structure.

7. The patty-forming apparatus as set forth in claim 1, said air burst-directing means including a substantially, centrally located, air-conveying opening, and a plurality of elongated air-conveying channels respectively in communication with said opening and with an individual one of said air passageways.

* * * * *